United States Patent [19]
Bellandi et al.

[11] Patent Number: 6,145,904
[45] Date of Patent: Nov. 14, 2000

[54] FLUID OPERATED GRIPPER DEVICE

[75] Inventors: Giuseppe Bellandi; Giuseppe Maffeis, both of Roncadelle, Italy

[73] Assignee: Festo AG & Co., Esslingen, Germany

[21] Appl. No.: 09/290,442

[22] Filed: Apr. 13, 1999

[30] Foreign Application Priority Data

Apr. 16, 1998 [DE] Germany .................. 298 06 798 U

[51] Int. Cl.⁷ .................................................. B66C 1/42
[52] U.S. Cl. ........................ 294/88; 294/95; 294/116
[58] Field of Search ............................ 294/88, 93, 94, 294/95, 116, 86.25, 86.3, 86.31; 901/37

[56] References Cited

U.S. PATENT DOCUMENTS

| | | | |
|---|---|---|---|
| 2,507,127 | 5/1950 | True | 294/86.31 |
| 3,075,800 | 1/1963 | Rowekamp | 294/88 |
| 3,108,835 | 10/1963 | Rowekamp | 294/116 |
| 3,588,165 | 6/1971 | Varga | 294/86.3 |
| 3,758,145 | 9/1973 | Kinley | 294/86.3 |
| 4,234,223 | 11/1980 | O'Niel | 294/88 |
| 4,667,998 | 5/1987 | Borcea et al. | 294/88 |
| 5,853,211 | 12/1998 | Sawdon et al. | 294/116 |

FOREIGN PATENT DOCUMENTS

| | | |
|---|---|---|
| 160353 | 6/1983 | Germany . |
| 3306526 C2 | 9/1984 | Germany . |

Primary Examiner—Dean J. Kramer
Assistant Examiner—Paul T. Chin
Attorney, Agent, or Firm—Hoffman & Baron LLP

[57] ABSTRACT

A fluid operated gripper which possesses a gripper device housing resembling a hollow body and on which a bearing body is secured. On the bearing body at least two relatively moving gripper device jaw carriers are movably mounted in a slot arrangement. A drive piston runs in a piston chamber. The bearing body is designed in the form of an insert body, which is seated like a cartridge in a receiving chamber arranged in an axial extension of the piston chamber. The slot arrangement is overlapped to the side externally by the housing wall, which delimits the receiving chamber, for at least part of its length.

26 Claims, 4 Drawing Sheets

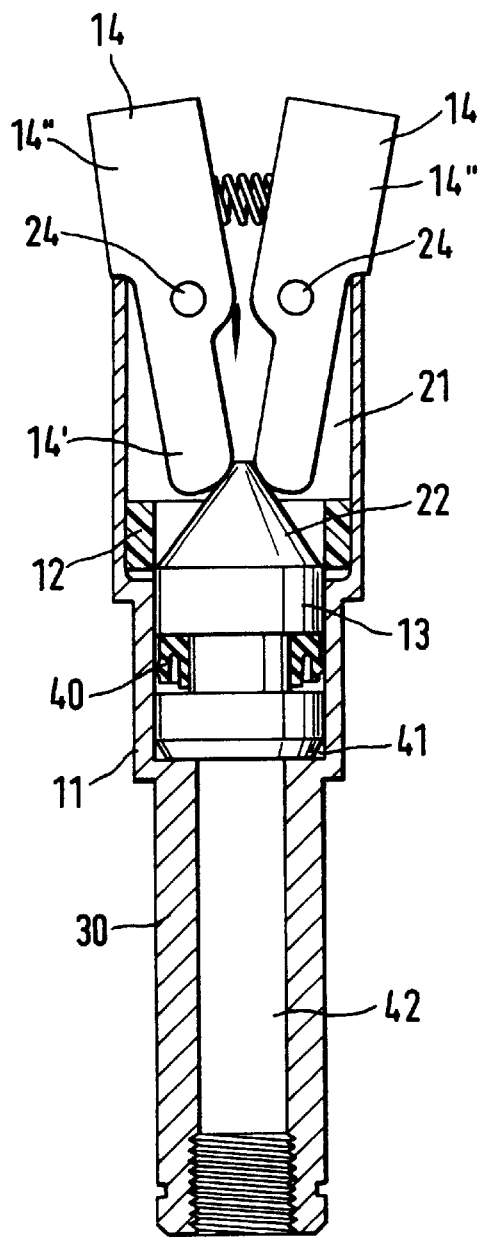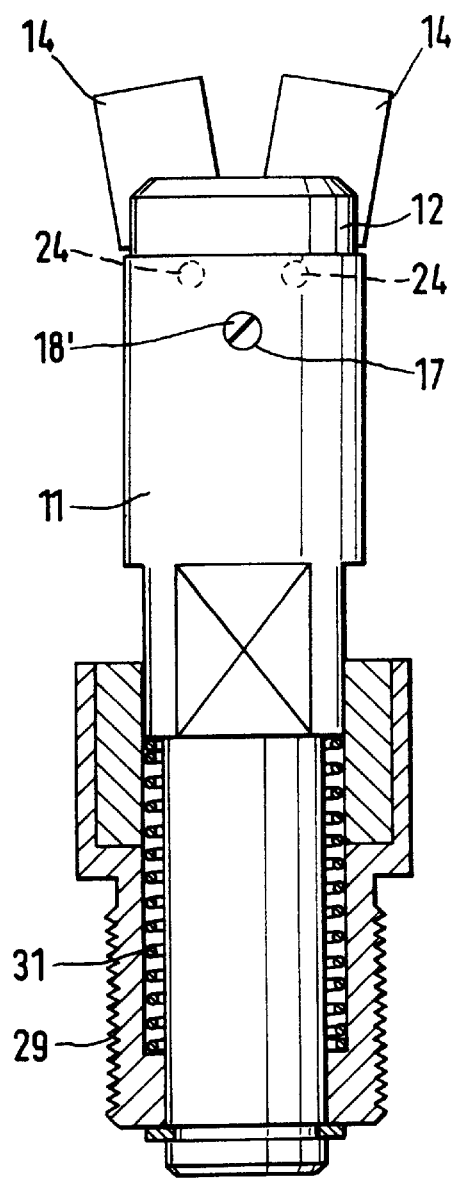
Fig. 4
Fig. 5

FLUID OPERATED GRIPPER DEVICE

BACKGROUND OF THE INVENTION

The invention relates to a fluid operated gripper device comprising a gripper housing designed like a hollow body on which a bearing member is secured, on which in a slot arrangement consisting of one or more slots at least two gripper device jaw carriers are movably mounted, said carriers being able to be moved between an open position and a closed position in relation to one another, and an actuating element able to be shifted between two positions for causing movement of the gripper jaw carriers, shift of said actuating element in at least one direction being caused by operation of a piston running in a piston chamber.

THE PRIOR ART

A gripper device of this type, which is designed in the form of a so-called angle gripper device, is disclosed in a brochure entitled "Greifer—die Handhabung im Griff" (gripper devices—getting to grips with handling), page 3, published by the assignee. This gripper device comprises a housing resembling a hollow body, in which a piston runs and from which an actuating element carried on the piston extends. At the end on the gripper device housing a bearing body is screwed, which possesses a gripper device carrier adapted to be fitted with a replaceable gripper jaw and pivotally mounted in a slot arrangement. Shifting of the actuating element caused by operation of the piston leads to a pivoting of the gripper device jaw carrier between an open position and a closed position.

Such known gripper device is extremely robust and is characterized by reliable operation. However its structure is still somewhat elaborate and is more particularly it is hard to miniaturize it further.

SHORT SUMMARY OF THE INVENTION

One object of the invention is to create a gripper device of the type initially mentioned, which renders possible simpler manufacture and more compact dimensions.

In order to achieve these and/or other objects appearing from the present specification, claims and drawings, in the present invention the bearing body is designed in the form of an insert body, which is seated in the manner of a cartridge in a receiving chamber, arranged as an axial extension of the piston chamber, of the gripper device housing, the slot arrangement being overlapped to the side externally by the wall, delimiting the receiving chamber, of the gripper device housing, such overlap being for at least a part of the length.

It is in this manner that a gripper device is provided which is characterized by particularly compact dimensions and which owing to its design renders possible particularly small overall dimensions, and in the case of which may be termed a micro-gripper. During the manufacture it is possible for the gripper device carriers to be fitted in advance on the insert body, which is then to be inserted like a cartridge into the associated receiving chamber. Because the insert body is for at least part of its length encircled by the housing wall delimiting the receiving chamber, there is a reliable transverse supporting effect, something which makes the use of elaborate attachment means unnecessary. As a rule it is sufficient to provide means for securing the axial position of the insert body.

Advantageous further embodiments of the invention are recited in the claims. A more particularly compact arrangement is produced if the piston chamber is not provided in a separate drive cylinder, but is rather designed as a component of the gripper device housing and merges directly coaxially with the receiving chamber. In this manner the gripper device housing simultaneously assumes the function of a cylinder housing.

As regards minimizing the overall size it is particularly useful for the actuating element to be designed integrally with the piston.

In the case of a further advantageous design the insert body has a axial recess open toward the piston chamber, into which recess the actuating element or, respectively, the piston extends so that in addition to the piston chamber it can contribute to guiding sliding movement and transverse supporting action for the actuating element or, respectively, piston.

The insert body preferably comprises a low friction material, that is to say material with a low coefficient of friction, plastic material or brass being more particularly suitable for this purpose. Besides general lubrication performed in the course of assembly there will as a rule be no further need for any lubrication during the working life of the gripper device.

The gripper device jaw carriers are preferably mounted in a pivotal manner on the insert body. It is in this manner that it is possible to design an angle gripper device for example. The positions of the pivot joints are in this case preferably so provided on the insert body that same are located in the interior of the receiving chamber and are well protected against dirt.

The pivot bearing means of the gripper device jaw carriers may involve the use of separate bearing pins, which are received in bearing recesses in the insert body. In this respect it is an advantage that such arrangement does not involve press fitting the bearing pins in place, providing they are enclosed and held by the wall of the receiving chamber so that they cannot drop out and be lost.

A design which is particularly simple for assembly is one in which the insert body is held by detent connection means in the receiving chamber so that it is possible to do without screws. This furthermore renders possible a design with particularly small overall sizes.

As an alternative a screw connection is however also more particularly suitable, if the gripper device is subject to high loads, which could not reliably be withstood by a detent connection.

In any case the respective attachment means are conveniently so designed that the direction force therein extends in parallelism to the pivot axes of the gripper device jaw carriers so that jamming or seizing is prevented, which would otherwise impair the mobility of the gripper device jaw carriers and would be the cause of rapid wear.

The insert body may be designed in a single piece, for example as a single plastic part. It is more especially in the case of somewhat larger dimensions that however a multipart design is to be recommended, the insert body being longitudinally divided adjacent to the slot arrangement and being made up of several insert elements, said insert element being placed together along their longitudinal sides. The elements may be put and held together prior to assembly in the receiving chamber for example by placing them from opposite sides so that they are fitted on the bearing pins (serving for pivotally bearing the gripper device jaw carriers), such pins fitting into the bearing recesses.

It is possible to provide a return spring means urging the gripper device jaw carrier into the open or into the closed position. In this case it is sufficient for the actuating diameter comprising the piston to be single acting, a supply of actuating fluid only being required for causing a shifting motion in one direction, since the return movement is performed by the return spring. This renders possible a particularly simple design of the gripper device housing as well, if the piston chamber is designed as a part of the same, since in this case for fluid operation a single fluid duct is sufficient, which opens on the axial side opposite to the receiving chamber and furthermore extends axially in the gripper device housing and opens at the rear side, opposite to the opening of the receiving chamber, of the gripper device housing.

The gripper device may be designed with various different housing shapes and furthermore permits extremely adaptable attachment on an associated gripper device carrier, as for instance on the output drive part of a rotary and/or linear drive unit.

Further advantageous developments and convenient forms of the invention will be understood from the following detailed descriptive disclosure of embodiments thereof in conjunction with the accompanying drawings.

LIST OF THE SEVERAL VIEWS OF THE FIGURES

FIG. 4 shows a still further design of a gripper device in a longitudinal sectional view corresponding to FIG. 2, the gripper device jaw carriers being in the open position and the gripper device being of the "normally open" type.

FIGS. 5 and 6 show the gripper device of FIG. 4 in a side elevation together with a modified form of suitable attachment means, which render possible an attachment to a gripper device carrier.

DETAILED ACCOUNT OF WORKING EMBODIMENTS OF THE INVENTION

Figure 1:
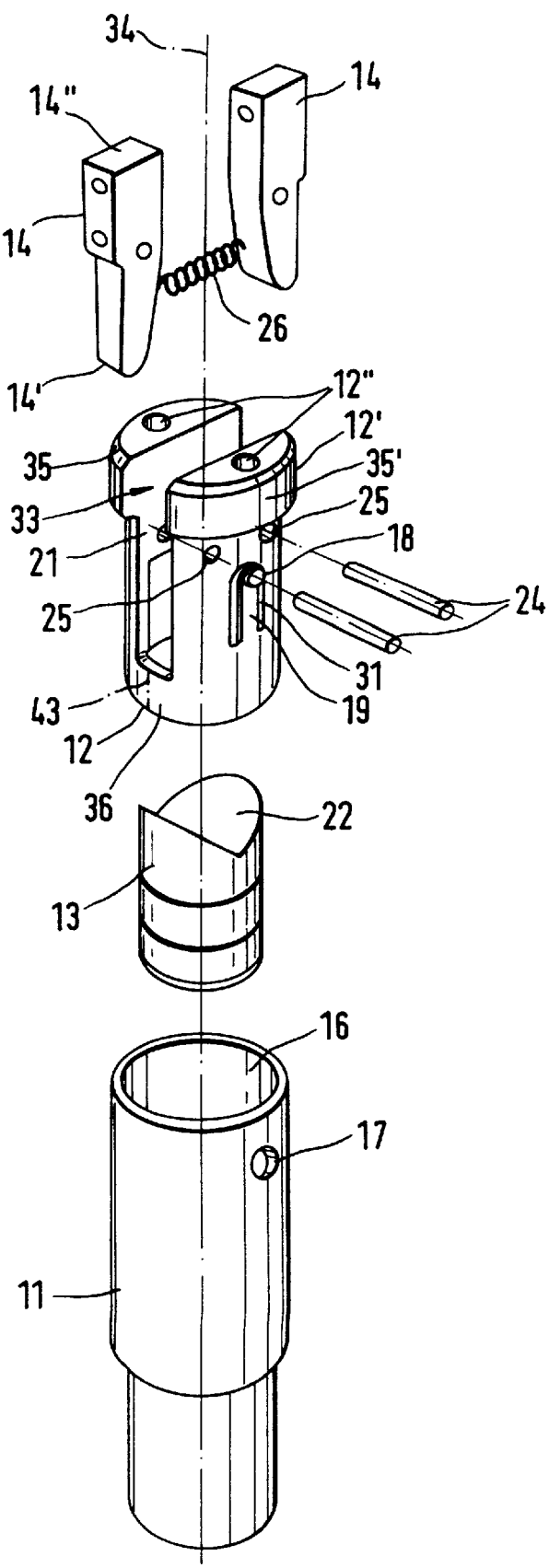
FIG. 1 shows a first design of the gripper device in a perspective, exploded view.

The gripper devices in accordance with the present embodiment are operated pneumatically using compressed air. They respectively comprise a gripper device housing 11, an insert body 12 serving as a bearing body for two gripping device jaw carriers 14 and a piston 13 serving for operation of the gripper device jaw carrier 14.

The gripper device housing 11 is designed like a hollow body and in the present embodiment of the invention possesses a single or multiply stepped cylindrical external. shape. It delimits axially extending internal space, which is divided up into two axially sequentially and preferably directly coaxially merging chambers, that is to say a piston chamber 15 and a receiving chamber 16. The receiving chamber 16 is open at a front axial side of the gripper housing 11. The piston chamber 15 adjoins it at the rear side of the gripper device housing 11 and functionally at the rear axial side is delimited by a terminating wall 30 of the gripper device housing 11. The diameter of the receiving chamber 16 is preferably larger than that of the piston chamber 15.

The insert body 12 is inserted from the front axial side like a cartridge into the receiving chamber 16. An attachment section 31 thereof, which is mounted in the receiving chamber 16, bears radially against the housing wall 32, which delimits the receiving chamber peripherally, of the gripper device housing 11. The receiving chamber 16 is preferably shaped like a circular cylinder, the attachment section 31 having a complementary external shape so that it is supported in the transverse direction.

The depth of insertion of the insert body 12 is delimited by an abutment collar 12', which is arranged on the front end region, extends past the attachment section 31 radially and abuts against the axially directed end face of the housing wall 32.

The gripper device jaw carriers 14 are mounted movably in a slot arrangement 33 in the insert body 12. In the working embodiment of the invention two gripper device jaw carriers 14 are provided, which are opposite to each other in relation to the longitudinal axis 34 of the insert body 12 and, respectively, of the receiving chamber 16 and together are held in a single slot 21 in the insert body 12. This slot 21 extends diametrally, it being open both at the front end face and also at diametrally opposite points at the lateral and, respectively, peripheral face of the insert body 12.

Since the insert body 12 is furthermore provided with an axial recess 20, which extends axially a small distance and is open at the rear side, there is a division up of the insert body 12 into two insert elements 35 and 35' flanking the slot 21, such elements 35 and 35' only being connected in the rear region of the insert body 12 by the connecting ribs 36 delimiting the length of the slot.

In the front end face of the insert elements 35 and 35' there are in the present example axial recesses 12", which permit the attachment of any additional parts required.

In the inserted state of the insert body 12 the lateral openings of the slot 21 are overlapped and covered over by the housing wall 32 for part of its length. The covered part of the length is here that part which extends in the attachment section 31. It is in this manner that entry of dirt is reliably prevented.

The two gripper device jaw carriers 14 are pivotally mounted on the insert body 12. Their pivot joints are here so arranged that they are located in the interior of the receiving chamber 16 where they are also well protected against dirt.

In the working embodiment a separate bearing pin 24 is provided for mounting each gripper device jaw carrier 14. Each bearing pin 24 extends at a right angle to the plane of the slot 21, extending athwart and through same, it having its end sections fitted in bearing recesses 25 on each side of the slot in the insert elements 35 and 35'.

It is not normally necessary to force fit the bearing pin 24 in the bearing recesses 25 in an axially fixed fashion. The housing wall 32 surrounds the bearing recesses 25 and accordingly their openings at the peripheral output face of the attachment section 31 so that it functions as an abutment, which retains the bearing pins in their bearing recesses 25 without any chance of their being lost.

The gripper device jaw carriers 14 respectively comprise a carrier portion 14" and an actuating portion 14' which starting at the pivot axes 37 defined by the bearing pins 24 are directed in different directions. In the working example they extend essentially in opposite direction. The carrier portions 14" extend at the end slot opening out from the insert body 12 and the actuating portions 14' extend toward the piston chamber 15, but however come to an end within the insert body 12.

As may be required it is possible for suitable gripper jaws, not illustrated in detail, to be secured to the carrier portions 14" in as detachable fashion. They are selected in accordance with the required gripping function. However it would also be possible to provide gripper device jaws integral with the gripper device jaw carriers 14.

Between the two gripper device jaw carriers 14 a return spring means 26 takes effect. It sets the basic position of the gripper device jaw carrier 14. In both working embodiments it is constituted by a compression spring means, which in the case of the working embodiment of FIGS. 1 through 3 acts between the two actuating portions 14' and urges same into a normally spread apart position. The gripper device illustrated here is normally closed, the carrier portions 14' being normally thrust together by the return spring means 26 so that the closed position in accordance with FIG. 2 is held.

As an alternative a normally open design would also be possible in the case of which the gripper device jaw carriers 14 assume an open position. Such a design is illustrated in FIG. 4. In this case the return spring means 26 acts between the two carrier regions 14" and urges same into a spread apart position.

In addition to the supporting function for the insert body 12 in the embodiment the gripper device housing 11, which in the working example is integral, additionally assumes the function of a cylinder housing in connection with the actuating means 38 causing the movement of the gripper device jaw carriers. This actuating means 38 includes the piston 13, which runs in the piston chamber 15 axially. However it extends axially out from the piston chamber 15 and into the adjoining recess 20 in the insert body 12 fixed in the receiving chamber 16. By means of an actuating portion 39 arranged at the end it cooperates here with the actuating portions 14' of the gripper device jaw carriers 14. Thus the piston 13 simultaneously constitutes an actuating element for causing pivoting motion of the gripper device jaw carrier 14.

Figure 2:
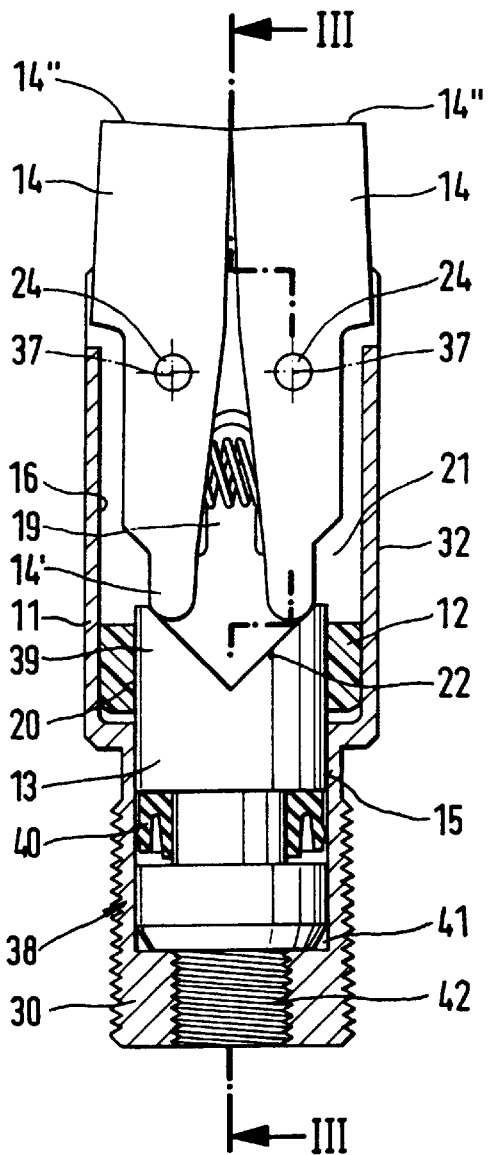
FIG. 2 shows the gripper device in accordance with FIG. 1 in an assembled state in longitudinal section with the gripper device jaw carriers having assumed the closed position, the gripper device being of the "normally closed" type.
Figure 3:
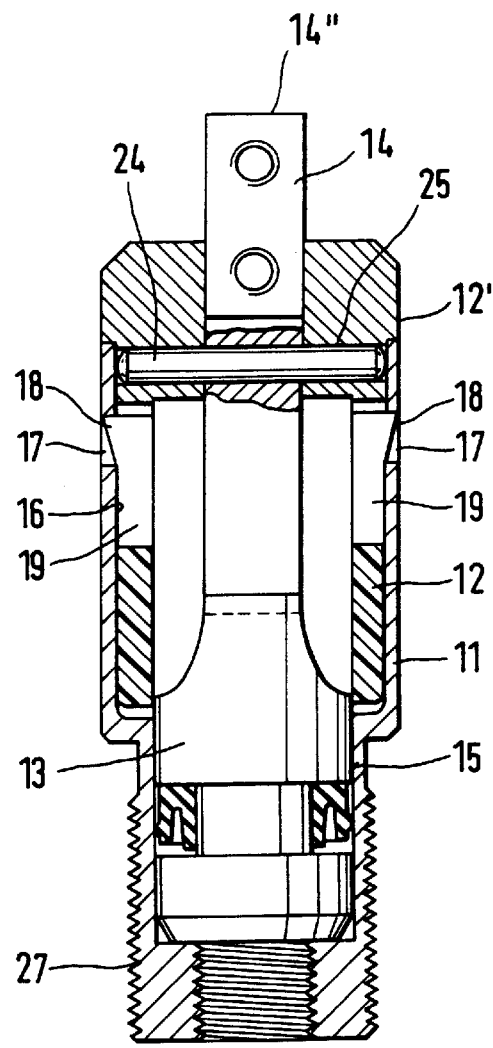
FIG. 3 shows the gripper device of FIG. 2 in a longitudinal section taken on the section line III—III in a section plane parallel to the pivot axes.

In the initial position indicated in FIGS. 2 through 4 the piston has moved as far as possible into the piston chamber 15 and is now near the rear axial side of the gripper device jaw housing 11. This initial position is preset by the actuating portions 14' which are subject to spring force and by contact with the actuating portion 39 cause the piston 13 to be thrust back.

An annular seal 40 provided functionally adjacent to the outer periphery of the piston 13 makes sealing contact and in an axially sliding manner with the peripheral face of the piston chamber 15 and serves to ensure a fluid-tight separation of one fluid actuation chamber 41 axially between the piston 13 and the rear terminating wall 30. Through this terminating wall 30 there extends a fluid duct 42 as a coaxial extension of the piston chamber 15, such duct 42 being able to be connected with the a source of pressure and rendering possible the supply of pressure medium, which in the case of the embodiment is for instance a pneumatic fluid. This pressure medium is in a position of causing displacement of the piston 13 toward the receiving chamber 16, piston actuating portion 39 so acting on the jaw actuating portions 14' that the gripper device jaw carriers 14 may be moved out from the previously assumed open or closed position into the respectively other position, namely the closed or open position. In order to bring about a return movement it is sufficient to vent the fluid actuation chamber 41.

In the embodiment it is an advantage that the end portion (which is adjacent to the piston chamber 15) of the axial recess 20 performs a guiding function with respect to the piston 13. Its inner peripheral face is adapted to play the role of a guide face, which surrounds the piston 13 so that same is supported in the transverse direction. Since accordingly there is a transverse supporting action for the piston 13 outside the piston chamber 15 as well, the reliable guiding action produced also reduces wear.

In the working embodiment the piston actuating portion 39 acts on the actuating portions 14' by means of jaw actuating faces 22 extending obliquely in relation to the direction of displacement of the piston 13. In the working embodiment of FIGS. 1 through 3 such actuating faces 22 are in the form of a female conical structure and in the case of the embodiment of FIG. 4 in the form of a male conical structure so that in the case of axial displacement they strike the jaw actuating portions 14' in the one case from the outside and in the other case from the inside in order to cause a drawing together or spreading out. It is not absolutely essential to use conically designed actuating faces 22 and it is sufficient to have actuating faces 22 opposite to each other at a suitable oblique angle comparable in principle with the arrangement of FIG. 1.

It is an advantage for the insert body 12 to consist of plastic material, which is characterized by good anti-friction properties. Alternatively brass or another commonly employed bearing material would be suitable. The gripper device housing 11 preferably consists of a metal such as steel or aluminum.

Since the insert body 12 is radially supported on all sides by the surrounding housing wall 32, it is possible to do without special additional attachment measures in this respect. Essentially, it is sufficient to take steps to see that the insert body 12 is set in the receiving chamber 16 without any possibility of axial displacement. In the working embodiment in accordance with FIGS. 1 through 3 this is ensured using suitable detent connection means.

For this purpose in the working embodiment the housing wall 32 delimiting the receiving chamber 16 is provided laterally with recesses or, as in the present case, with holes, which function as detent recesses 17 or dents. Detent projections 18 fit into them, such projections being provided laterally functionally at the outer periphery of the insert body 12. These detent projections 18 are preferably integrally connected with the insert body 12 and in the working example are borne by resiliently elastic lugs 19, which are cut from the wall of the insert elements 35 and 35'.

Figure 6:
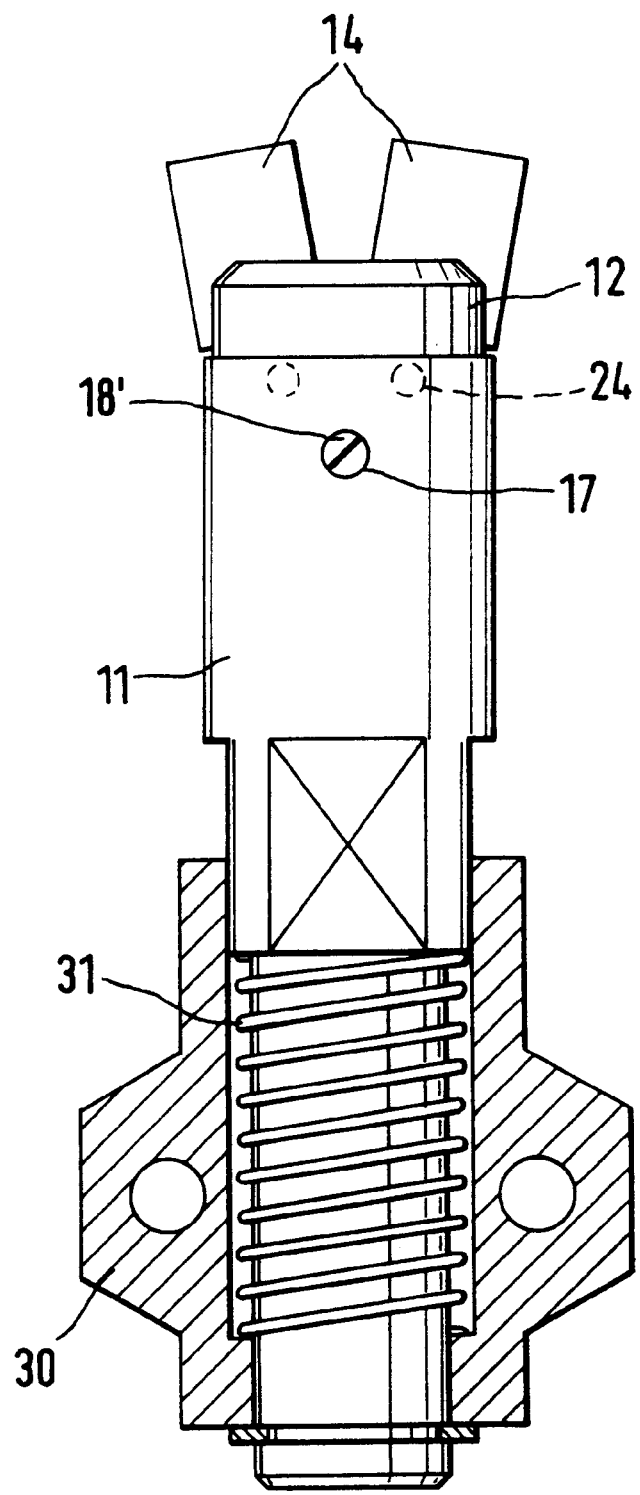

As an alternative it would also be possible to utilize screw connecting means as are indicated in FIGS. 5 and 6 as examples. In this case attachment screws 18' are provided, which extend through the housing wall 32 from the outside and anchored in the insert body 12.

In all cases the attachment means or measures are preferably such that their force transmitting direction extends in parallelism to the pivot axes 37 and, respectively, the bearing pins 24 so that the freedom of movement of the gripper device jaw carriers 14 is not impaired by any possibility of jamming.

The insert body 12 is in the working embodiment designed in the form of a single piece or integral component. Alternatively a multi-part structure is possible as well, in the case of which the insert body 12 is best longitudinally divided at its diametrally extending slot 21. In FIG. 1 the parting plane is indicated at 36 in chained lines which extends through the connection ribs 36 or webs which means that the insert body 12 comprises two separate insert elements 35 and 35' longitudinally adjacent to each other. The two insert elements 35 and 35' are then symmetrical in relation to the parting plane 43 and are identical in structure.

In order to sufficiently firmly hold the assembly composed of the insert body 12 and the gripper device jaw carriers 14 prior to fitting in the receiving chamber 16, the cross sectional dimensions of the bearing pins 24 and of the bearing recesses 25 are preferably so matched that the bearing pins 24 are seated in the bearing recesses 25 with a certain degree of force fit with the result that in the axial direction of the bearing pins 24 there is a pre-fixing effect. Finally it is to be pointed out suitable attachment means can be provided on the gripper device housing 11 which render possible a rigid and/or resiliently elastic attachment on a suitable gripper device carrier. In the case of the design in accordance with FIGS. 2 and 3 the gripper device housing 11 possesses attachment means in the form of an external screw thread 27. Other possibilities are to be seen in FIGS. 5 and 6, in the case of which sleeve-like attachment means 29 and 30 are seated on the gripper device housing 11, which may if appropriate can be arranged to be axially movable and acted upon by a spring biasing force 44 in order to provide automatic longitudinal compensation in the course of handling objects.

Finally it is to be noted as well that the gripper device can be furnished with suitable sensors to render possible the detection of one or more positions of the gripper device jaw carriers and to be able to integrate the gripper device in a system designed to perform a sequence of operations automatically.

What is claimed is:

1. A fluid operated gripper device comprising:
   a gripper housing having a hollow body defined by a wall,
   an insert body being secured to the housing, the insert body having a slot, a portion of which extends to the housing wall when the insert body is secured within the gripper housing,
   at least two gripper device jaw carriers being movably mounted to the insert body in the slot, and the insert body forming a bearing member for supporting the gripper jaw devices, the carriers being moveable between an open position and a closed position,
   an actuating element shiftable between two positions for causing movement of the gripper jaw carriers, wherein a shift of said actuating element in at least one direction being caused by operation of a piston running in a piston chamber,
   the insert body being seatable within a receiving chamber of said housing which axially extends from the piston chamber, the insert body including an axial recess therein aligned with the piston chamber for receiving and guiding the actuating element into engagement with the gripper device jaw carriers.

2. The gripper device as set forth in claim 1, wherein the receiving chamber and at least a portion within the receiving chamber of the insert body have an essentially cylindrical configuration.

3. The gripper device as set forth in claim 1, wherein the piston chamber is a component of the gripper device housing and directly merges at it with the receiving chamber coaxially.

4. The gripper device as set forth in claim 1, wherein the actuating element is directly constituted by the piston.

5. The gripper device as set forth in claim 1, wherein an end portion, facing the piston chamber, of the axial recess is adapted to serve for guiding displacement of the actuating element.

6. The gripper device as set forth in claim 1, wherein said insert body is manufactured of an anti-friction material.

7. The gripper device as set forth in claim 1, wherein the gripper device jaw carrier are pivotally mounted on the insert body at pivotal bearing points located in the interior of the receiving chamber.

8. The gripper device as set forth in claim 7, wherein each gripper device jaw carrier is pivotally seated on a bearing pin extending in a transverse direction through the slot and received in bearing recesses in the sections, which flank the slot on either side thereof, of the insert body.

9. The gripper device as set forth in claim 8, wherein the bearing pins on the insert body are located in the interior of the receiving chamber and are surrounded by the housing wall of the receiving chamber when the insert body is positioned within said housing to provide protection against dropping out and being lost.

10. The gripper device as set forth in claim 1, further comprising detent means for locating the insert body in the receiving chamber.

11. The gripper device as set forth in claim 10, wherein the housing wall delimiting the receiving chamber possesses detent recesses into which detent projections formed on the insert body engage.

12. The gripper device as set forth in claim 11, wherein the detent projections are provided on resiliently elastic lugs provided integrally on the insert body.

13. The gripper device as set forth in claim 10, wherein each gripper device jaw carrier is pivotally mounted on the insert body at pivotal bearing points preferably located in the interior of the receiving chamber, and wherein the direction of force transmission by the detent means extends in parallelism to pivot axes of the gripper device jaw carriers.

14. The gripper device as set forth in claim 10, wherein the insert body is secured to the gripper device housing with the aid of screw means extending athwart the longitudinal axis thereof.

15. The gripper device as set forth in claim 1, wherein the slot extends diametrically through the insert body, and in such slot two oppositely placed gripper device jaw carriers are movably mounted.

16. The gripper device as set forth in claim 15, wherein the insert body is longitudinally divided at the slot.

17. The gripper device as set forth in claim 1, wherein the insert body is integral.

18. The gripper device as set forth in claim 1, wherein attachment means are provided on the gripper device housing, such attachment means rendering possible a rigid and/or a resiliently yielding attachment on a gripper device support.

19. The gripper device as set forth in claim 1, wherein the gripper device jaw carriers are designed to releasable mount gripper device jaws.

20. The gripper device as set forth in claim 1, further comprising a return spring urging the gripper device jaw carriers between the open position and the closed position.

21. The gripper device as set forth in claim 1, wherein the actuating element is adapted to cooperate with the gripper device jaw carriers with the aid of actuating faces extending obliquely to its direction of displacement.

22. A fluid operated gripper device comprising:
   a gripper housing having a hollow body on which a bearing member is secured, the bearing member having a slot opening to a housing wall when said bearing member is inserted within said gripper housing,
   at least two gripper device jaw carriers being movably mounted in the slot, the carriers being moveable between an open position and a closed position,
   an actuating element shiftable between two positions for moving the gripper jaw carriers, wherein a shift of said actuating element in at least one direction being caused by operation of a piston running in a piston chamber, wherein the bearing member includes an insert body seatable within a receiving chamber of said housing which axially extends from the piston chamber, the insert body including detent projections extending therefrom, and wherein a portion of the housing wall delimiting the receiving chamber possesses detent recesses into which the detent projections of the insert body engage thereby locating the insert body in the receiving chamber.

23. The gripper device as set forth in claim 22, where in the detent projections are provided on resiliently elastic lugs provided on the insert body.

24. A fluid operated gripper device comprising:

a housing having a receiving chamber;

an insert body having a portion secured within the receiving chamber, the insert body having a slot and having an axially extending recess therein;

at least two gripper device jaw carriers moveably mounted to the insert body in the slot, the at least two jaw carriers being movable between an open position and a closed position; and an actuating element disposed in the housing and being translatable under fluid force between a first and second position for causing movement of the jaw carriers between the open and closed positions, the actuating element extending into the insert body recess and being guided by the insert body into engagement with the jaw carriers.

25. The gripper device as set forth in claim 24, wherein the receiving chamber is defined by a housing wall and a portion of the slot opens to and is bounded by the housing wall.

26. The gripper device as set forth in claim 24, wherein the insert body includes a resilient member extending between the insert body and the housing for permitting the insert body to be removeably secured in the housing.

* * * * *